United States Patent
Meyer et al.

(10) Patent No.: US 8,356,184 B1
(45) Date of Patent: Jan. 15, 2013

(54) DATA STORAGE DEVICE COMPRISING A SECURE PROCESSOR FOR MAINTAINING PLAINTEXT ACCESS TO AN LBA TABLE

(75) Inventors: Alan T. Meyer, Anaheim Hills, CA (US); Erik R. Habbinga, Broomfield, CO (US)

(73) Assignee: Western Digital Technologies, Inc., Irvine, CA (US)

( * ) Notice: Subject to any disclaimer, the term of this patent is extended or adjusted under 35 U.S.C. 154(b) by 629 days.

(21) Appl. No.: 12/491,441

(22) Filed: Jun. 25, 2009

(51) Int. Cl.
G06F 21/00 (2006.01)
(52) U.S. Cl. ........ 713/187; 711/163; 711/154; 711/100; 711/164
(58) Field of Classification Search .................... 713/187
See application file for complete search history.

(56) References Cited

U.S. PATENT DOCUMENTS

| | | | |
|---|---|---|---|
| 5,058,162 A | 10/1991 | Santon et al. | |
| 5,293,610 A | 3/1994 | Schwarz | |
| 5,418,927 A | 5/1995 | Chang et al. | |
| 5,530,960 A | 6/1996 | Parks et al. | |
| 5,805,800 A | 9/1998 | Kotani et al. | |
| 6,003,117 A | 12/1999 | Buer et al. | |
| 6,006,190 A | 12/1999 | Baena-Arnaiz et al. | |
| 6,061,449 A | 5/2000 | Candelore et al. | |
| 6,321,314 B1 | 11/2001 | Van Dyke | |
| 6,523,118 B1 | 2/2003 | Buer | |
| 6,633,963 B1 | 10/2003 | Ellison et al. | |
| 6,735,650 B1 | 5/2004 | Rothberg | |
| 6,738,904 B2 | 5/2004 | Linnartz et al. | |
| 6,823,398 B1 | 11/2004 | Lee et al. | |
| 6,845,387 B1 | 1/2005 | Prestas et al. | |
| 6,895,506 B1 | 5/2005 | Abu-Husein | |
| 6,968,459 B1 | 11/2005 | Morgan et al. | |
| 7,093,139 B2 | 8/2006 | Silverbrook et al. | |
| 7,149,854 B2 | 12/2006 | Weber et al. | |
| 7,215,771 B1 | 5/2007 | Hamlin | |
| 7,330,970 B1 | 2/2008 | Field | |
| 7,376,898 B1 | 5/2008 | Yehuda et al. | |
| 7,469,338 B2 | 12/2008 | Buer | |
| 7,469,345 B2 | 12/2008 | Shimada et al. | |
| 7,474,750 B2 | 1/2009 | Lekatsas et al. | |
| 7,607,177 B2 | 10/2009 | Estakhri et al. | |
| 7,765,373 B1 | 7/2010 | Merry et al. | |
| 7,912,991 B1 | 3/2011 | Merry et al. | |
| 7,971,071 B2 | 6/2011 | Walkoe et al. | |
| 2002/0107802 A1 | 8/2002 | Philips | |
| 2002/0141583 A1 | 10/2002 | Barnard et al. | |
| 2002/0152377 A1 | 10/2002 | Bauman et al. | |
| 2002/0166064 A1 | 11/2002 | Harrison | |
| 2003/0126455 A1 | 7/2003 | Sako et al. | |
| 2003/0145183 A1 | 7/2003 | Muehring | |

(Continued)

FOREIGN PATENT DOCUMENTS

EP 0 387 599 A2 9/1990

(Continued)

*Primary Examiner* — William Goodchild (57) ABSTRACT

A data storage device is disclosed comprising a non-volatile memory, a logical block address (LBA) table for storing plaintext data used to access the non-volatile memory, and control circuitry including a secure processor and a device processor. The secure processor is operable to initialize the LBA table with at least one authentication code over the plaintext data, and verify the authentication code over the plaintext data. The device processor is operable to receive an access command from a host, evaluate the plaintext data in the LBA table to determine whether to allow the access command, and when the access command is allowed, execute the access command.

20 Claims, 6 Drawing Sheets

U.S. PATENT DOCUMENTS

| | | |
|---|---|---|
| 2004/0117309 A1 | 6/2004 | Inoue et al. |
| 2004/0170175 A1* | 9/2004 | Frank et al. ................... 370/392 |
| 2004/0236918 A1 | 11/2004 | Okaue et al. |
| 2005/0005149 A1 | 1/2005 | Hirota et al. |
| 2005/0060481 A1* | 3/2005 | Belonoznik ................... 710/315 |
| 2005/0071656 A1 | 3/2005 | Klein et al. |
| 2005/0091509 A1 | 4/2005 | Herberth |
| 2005/0100163 A1 | 5/2005 | Buer |
| 2005/0125692 A1* | 6/2005 | Cox et al. ..................... 713/201 |
| 2005/0185067 A1 | 8/2005 | Estakhri et al. |
| 2005/0240738 A1 | 10/2005 | Shirogane et al. |
| 2006/0031687 A1 | 2/2006 | Su et al. |
| 2006/0041934 A1 | 2/2006 | Hetzler |
| 2006/0059369 A1 | 3/2006 | Fayad et al. |
| 2006/0080526 A1 | 4/2006 | Kasahara et al. |
| 2006/0092049 A1 | 5/2006 | Dellow |
| 2006/0174055 A1 | 8/2006 | Flynn |
| 2006/0174298 A1 | 8/2006 | Chen et al. |
| 2006/0177068 A1 | 8/2006 | Hatakeyama |
| 2006/0288235 A1 | 12/2006 | Goto |
| 2007/0038827 A1 | 2/2007 | Inooka et al. |
| 2007/0067647 A1 | 3/2007 | Klein |
| 2007/0130625 A1* | 6/2007 | Lee ................................ 726/26 |
| 2007/0168676 A1 | 7/2007 | Fayad et al. |
| 2007/0172053 A1 | 7/2007 | Poirier |
| 2007/0180210 A1* | 8/2007 | Thibadeau .................... 711/163 |
| 2007/0186117 A1 | 8/2007 | Klein et al. |
| 2007/0192610 A1 | 8/2007 | Chun et al. |
| 2007/0223705 A1 | 9/2007 | Kasahara et al. |
| 2008/0109660 A1 | 5/2008 | Mitra |
| 2008/0189500 A1 | 8/2008 | Jennings et al. |
| 2008/0320314 A1 | 12/2008 | Eckleder et al. |

FOREIGN PATENT DOCUMENTS

| | | |
|---|---|---|
| EP | 1 164 588 A2 | 12/2001 |
| EP | 1 587 095 A2 | 10/2005 |
| GB | 2 374 718 A | 10/2002 |

* cited by examiner

| STARTING LBA | LENGTH | STATE | AUTHENTICATION CODE |
|---|---|---|---|
| 00000 | 01000 | LOCKED READ/WRITE | 4bcb287e284f8c21e87e14ba2dc40b16 |
| 01000 | 05000 | UNLOCKED READ | 87e14ba2dc40b164bcb287e284f8c2aa |
| 05000 | 01000 | UNLOCKED WRITE | 4bcb287e87e14ba2ddc40bdc40b123db |
| 06000 | 02000 | UNLOCKED READ/WRITE | 1234287e284f8c21e87e14ba2dc40b16 |
| 08000 | 10000 | LOCKED READ/WRITE | 56784ba2dc40b164bcb287e284f8c2ef |
| 18000 | 2000 | UNLOCKED READ/WRITE | 9abc287e87e14ba2ddc40bdc40b123bb |
| ⋮ | ⋮ | ⋮ | ⋮ |
| 50000 | 1000 | UNLOCKED READ/WRITE | 00004ba27789403abe0f235ab84f8c211 |

DATA STORAGE DEVICE COMPRISING A SECURE PROCESSOR FOR MAINTAINING PLAINTEXT ACCESS TO AN LBA TABLE

BACKGROUND

Description of the Related Art

Computer systems (e.g., desktops, laptops, portables, etc.) typically employ some form of a non-volatile data storage device such as a disk drive, or a solid state drive comprising a non-volatile semiconductor memory such as flash memory. A solid state drive typically emulates a disk drive so that the same communication protocol may be employed. That is, a host typically interfaces with a solid state drive using a standard disk drive communication protocol, such as the Advanced Technology Attachment (ATA) protocol.

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a servo controller to control the velocity of the actuator arm as it seeks from track to track.

Data storage devices may employ one or more security features, such as authenticating users accessing the data storage device and/or encrypting the stored user data to prevent unauthorized access of the user data. Private keys may be stored in the data storage device to implement the security features, such as keys for generating message authentication codes and/or keys for implementing an encryption algorithm (e.g., RSA, DES, etc.).

DETAILED DESCRIPTION OF EMBODIMENTS OF THE INVENTION

Figure 1A:
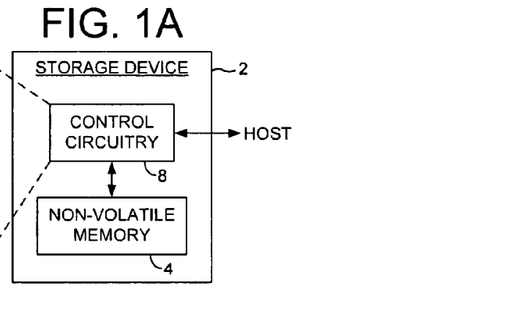
FIG. 1A shows a data storage device according to an embodiment of the present invention comprising a non-volatile memory and control circuitry.
Figure 1B:
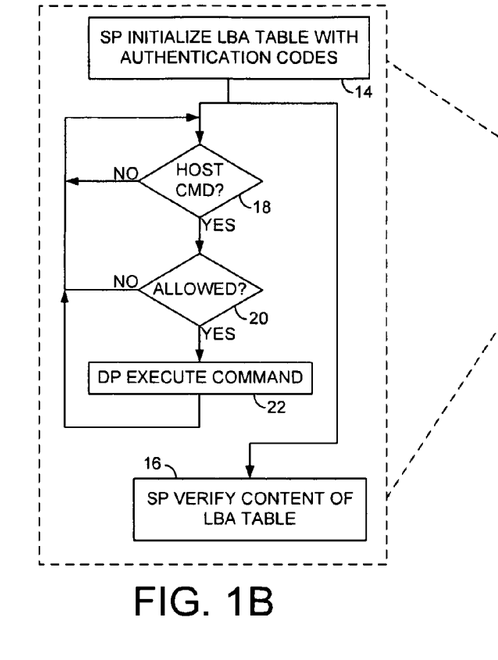
FIG. 1B is a flow diagram executed by the control circuitry according to an embodiment of the present invention wherein plaintext data stored in an LBA table is evaluated to determine whether to allow an access command received from a host.
Figure 1C:
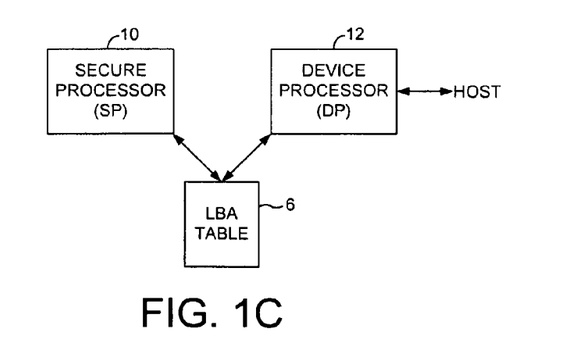
FIG. 1C shows control circuitry according to an embodiment of the present invention including a secure processor and a device processor.

FIG. 1A shows a data storage device 2 comprising a non-volatile memory 4, a logical block address (LBA) table 6 (FIG. 1C) for storing plaintext data used to access the non-volatile memory 4, and control circuitry 8 including a secure processor 10 and a device processor 12. FIG. 1B shows a flow diagram according to an embodiment of the present invention wherein the secure processor 10 initializes the LBA table with at least one authentication code over the plaintext data (step 14), and verifies the authentication code over the plaintext data (step 16). The device processor receives an access command from a host (step 18), evaluates the plaintext data in the LBA table to determine whether to allow the access command (step 20), and when the access command is allowed, executes the access command (step 22).

The secure processor 10 may verify the authentication code over the plaintext data in the LBA table at any suitable time. In one embodiment, the secure processor 10 verifies the authentication code periodically as the device processor 12 executes the access commands received from the host. In an alternative embodiment described below, the device processor 12 executes each access command through the secure processor 10, wherein the secure processor 10 verifies the authentication code prior to executing each access command.

Figure 2:
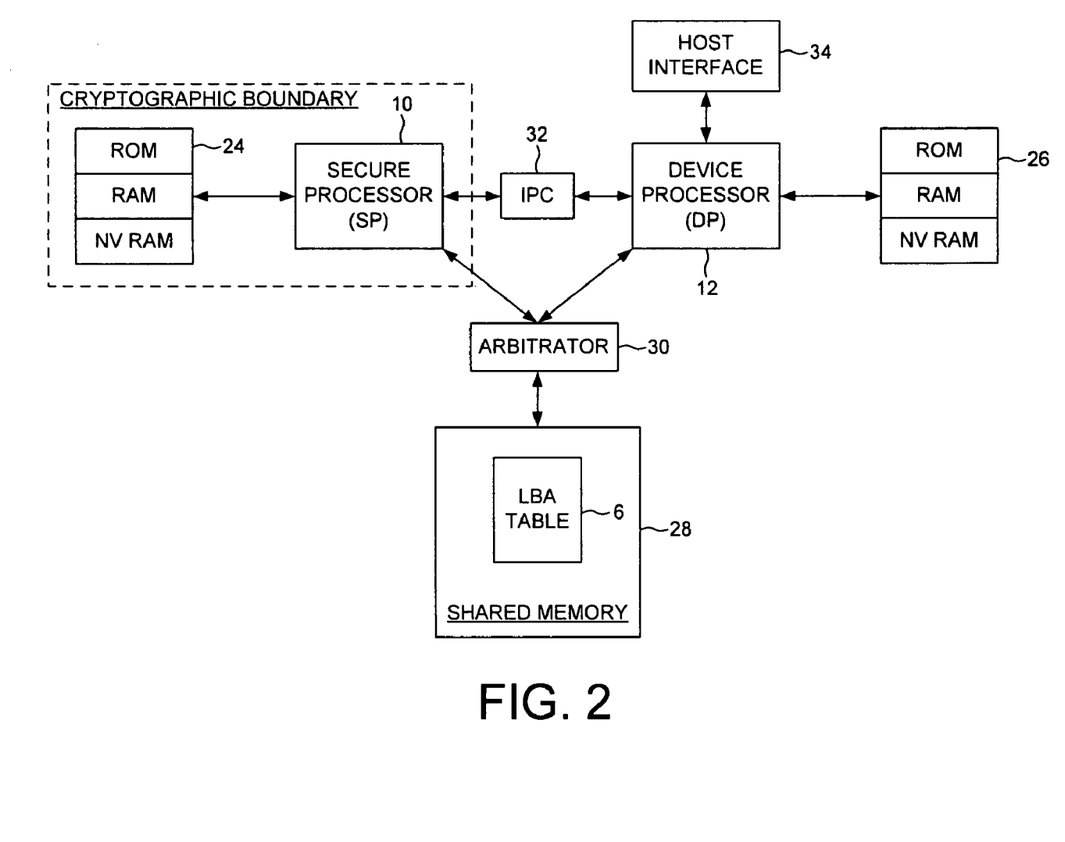
FIG. 2 shows control circuitry according to an embodiment of the present invention wherein the secure processor interfaces with private memory, the device processor interfaces with public memory, and an inner processor communication subsystem facilitates communication between the processors.

FIG. 2 shows control circuitry according to an embodiment of the present invention wherein the secure processor 10 accesses private memory 24 and the device processor 12 accesses public memory 26. The control circuitry further comprises a shared memory 28 for storing the LBA table 6, and arbitration circuitry 30 for arbitrating access to the shared memory 28. An inner processor communication subsystem 32 facilitates communication between the device processor 12 and the secure processor 10, and a host interface subsystem 34 facilitates communication between the device processor 12 and the host to carry out the access commands (read/write commands).

Figure 3:
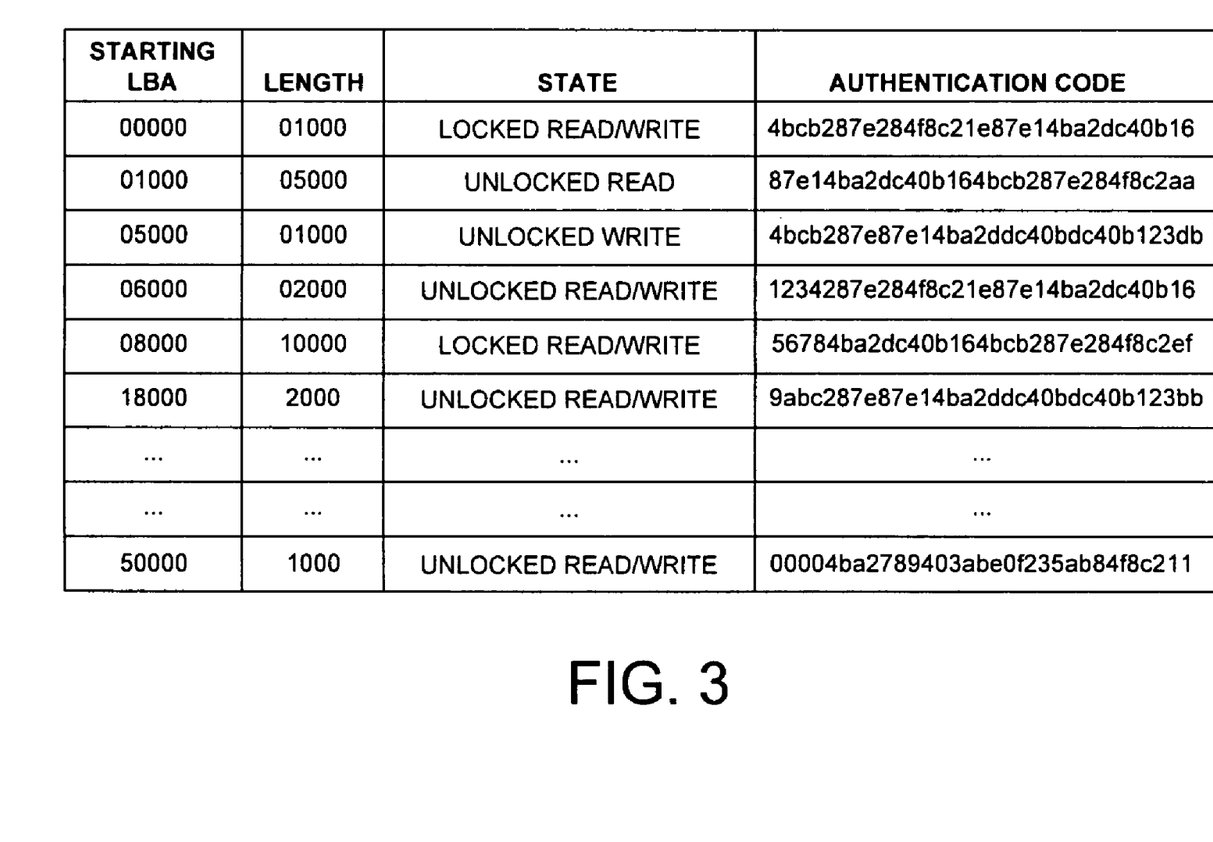
FIG. 3 shows an LBA table according to an embodiment of the present invention comprising an address range for accessing the non-volatile memory, a state field indicating whether the corresponding address range is locked, and an authentication code generated over the plaintext data.

FIG. 3 shows a format of an LBA table according to an embodiment of the present invention comprising a plurality of entries, wherein each entry comprises an address range for accessing the non-volatile memory, a state field indicating whether the corresponding address range is locked, and an authentication code generated over the plaintext data. In the embodiment of FIG. 3, the address range comprises a starting logical block address (LBA) and a length (number of logical blocks). In the embodiment of FIG. 3, the state field indicates whether the corresponding address range is one of locked read/write, unlocked read, unlocked write, or unlocked read/write. Locked read/write means the device processor 12 is prevented from performing a read or write access command in the corresponding address range. Unlocked read means the address range can be read but not written, unlocked write means the address range can be written but not read, and unlocked read/write means the address range can be read and written.

Any suitable algorithm may be employed to generate the authentication code over the plaintext data (the address range and state in the embodiment of FIG. 3). In one embodiment, the authentication code is generated using a suitable cryptographic algorithm (e.g., using a Hashing Message Authentication Code (HMAC)). The authentication code may be generated using a private key that is stored securely within the cryptographic boundary associated with the secure processor 10 (e.g., stored in the private memory 24).

Figure 4:
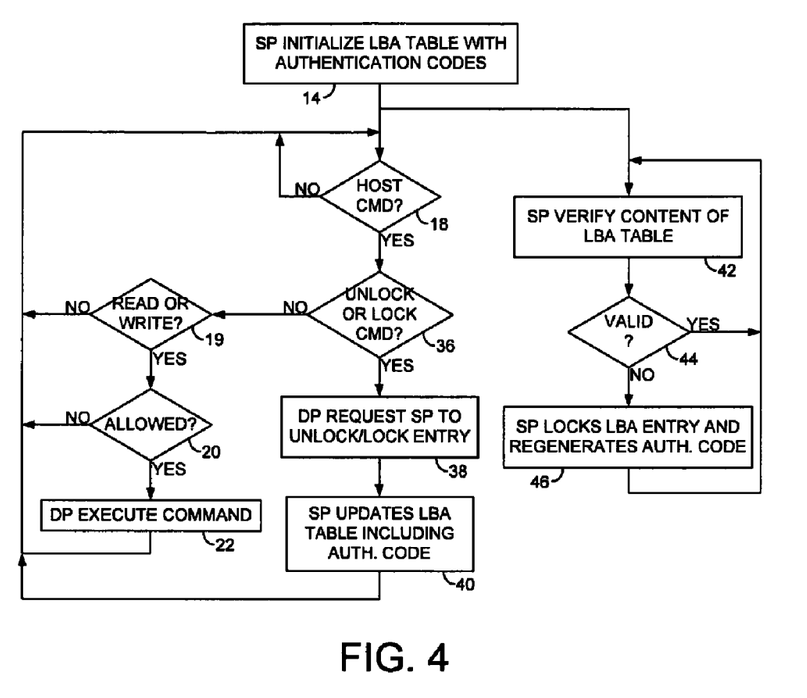
FIG. 4 is a flow diagram according to an embodiment of the present invention wherein the device processor requests the secure processor to unlock an entry in the LBA table.

FIG. 4 is a flow diagram according to an embodiment of the present invention wherein when the device processor receives a security command from the host to unlock or lock one of the entries in the LBA table (step 36), the device processor requests the secure processor to unlock or lock the entry (step 38). The secure processor unlocks/locks the entry of the LBA table by modifying the corresponding state field, and generates an updated authentication code over the modified plaintext data (step 40). Thereafter, when the device processor receives a read or write access command (step 19), the device processor evaluates the LBA table to determine whether the corresponding state field is unlocked for the type of access command. If the state field is in the unlocked state (step 20), the device processor executes the access command (step 22). While the device processor is waiting for or executing the access commands received from the host, the secure processor verifies the authentication codes in the LBA table (step 42). If one of the authentication codes is invalid (step 44) indicating the plaintext data of the corresponding entry was modified illegally, the secure processor locks the entry by modifying the state field and generates an updated authentication code over the modified plaintext data (step 46). In other embodiments when an invalid authentication code is detected, the secure processor may lock or disable access to the entire LBA table to disable access to all of the secure addresses ranges, or the secure processor may disable access to the data storage device in general (the secure address ranges as well as the public address ranges).

Figure 5:
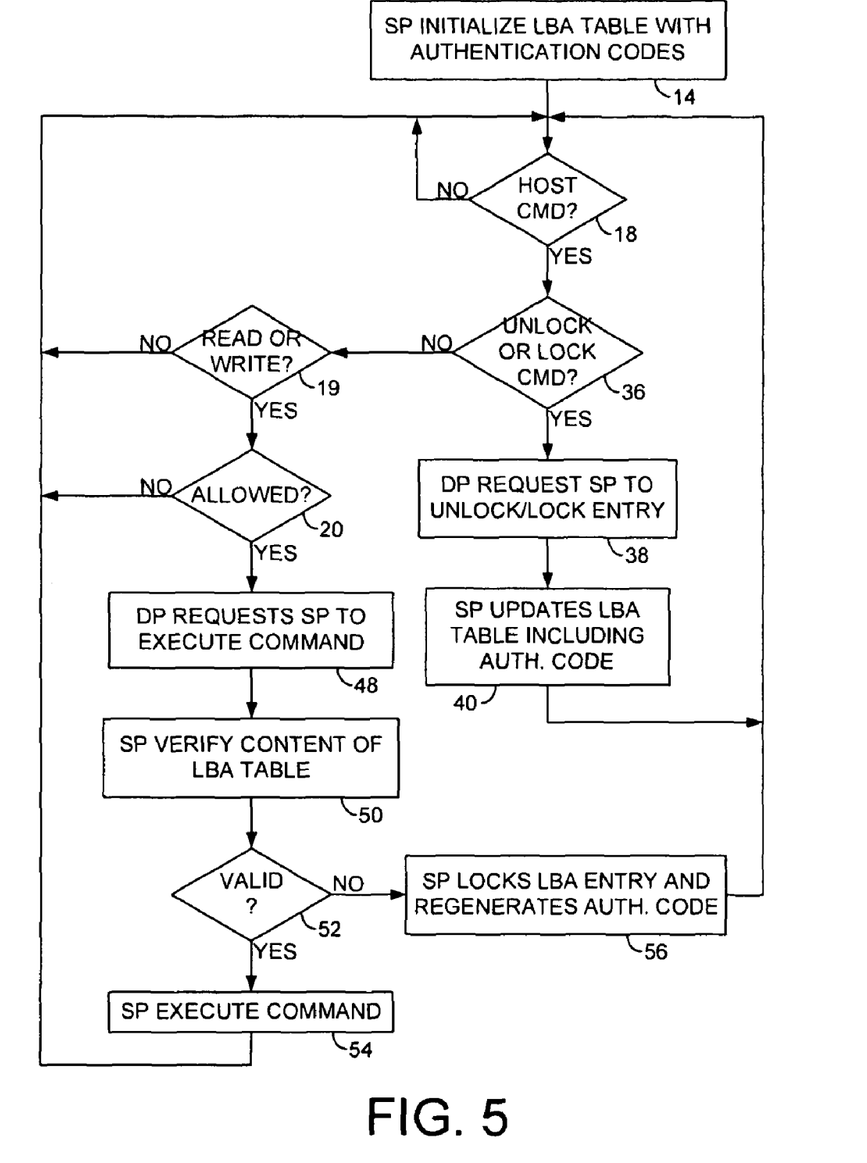
FIG. 5 is a flow diagram according to an embodiment of the present invention wherein the device processor requests the secure processor to execute an access command, and the secure processor verifies the LBA table before executing the access command.

The data of an access command corresponding to the secure address ranges in the LBA table may be stored as plaintext data or encrypted data. That is, the data may be encrypted during a write operation, and then decrypted during a read operation. In an embodiment illustrated in the flow diagram of FIG. 5, the secure processor implements the encryption/decryption algorithms using private keys stored in the private memory 24. When a read or write access command is received from the host (step 19), the device processor evaluates the corresponding entry in the LBA table to determine whether the type of access command is allowed (step 20). If the access command is allowed (as indicated by the state field), the device processor requests the secure processor to execute the access command (step 48). Before executing the access command, the secure processor evaluates the LBA table to verify the authentication code of the corresponding entry (step 50). If the authentication code is valid (step 52), the secure processor executes the access command (step 54), whereas if the authentication code is invalid, the secure processor takes appropriate protective action such as locking the entry of the LBA table and generating an updated authentication code over the modified plaintext data (step 56).

The LBA table may comprise any suitable format, and in one embodiment, the entries of the LBA table may be of variable length. For example, in one embodiment the LBA table comprises variable length records of an XML file, wherein an authentication code is generated over each variable length record. In addition, the authentication code may be generated over any suitable part of the LBA table, such as all of the plaintext data within each entry, or over select fields of each entry. In yet another embodiment, an authentication code may be generated over multiple entries of the LBA table, and in one embodiment, an authentication code is generated over all of the entries in the LBA table. In the latter embodiment, the secure processor can detect an illegal modification to any entry within the LBA table by evaluating a single authentication code covering the entire LBA table.

Figure 6:
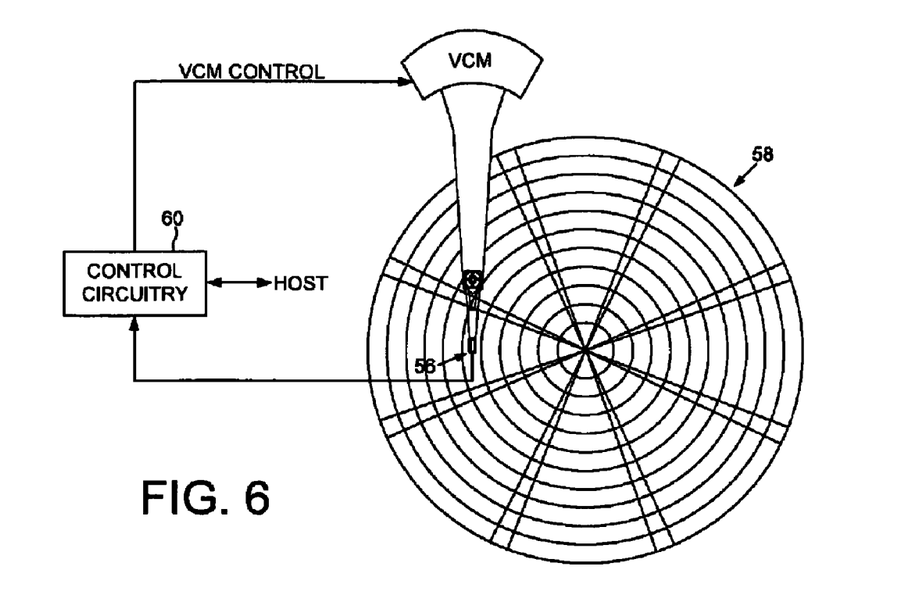
FIG. 6 shows an embodiment of the present invention wherein the data storage device comprises a disk drive.
Figure 7:
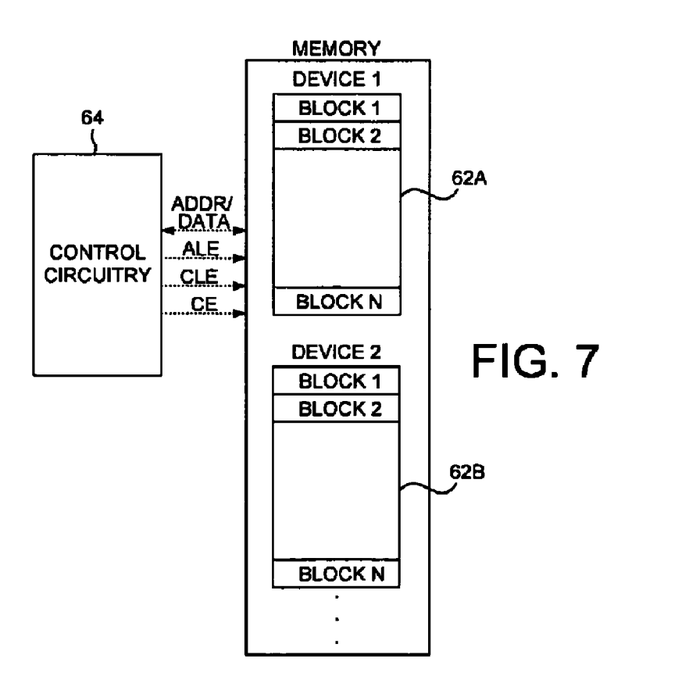
FIG. 7 shows an embodiment of the present invention wherein the data storage device comprises a solid state drive.

The embodiments of the present invention may be employed in any suitable data storage device. FIG. 6 shows a data storage device comprising a disk drive including a head 56 actuated over a disk 58 and control circuitry 60 for executing the flow diagrams described herein. FIG. 7 shows a solid state drive comprising a plurality of non-volatile semiconductor memories 62A, 62B, etc., such as flash memories, and control circuitry 64 for executing the flow diagrams described herein. A hybrid data storage device may also be employed comprising components of a disk drive shown in FIG. 6 combined with the non-volatile semiconductor memories shown in FIG. 7.

Any suitable control circuitry may be employed to implement the flow diagrams in the embodiments of the present invention, such as any suitable integrated circuit or circuits. In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a system on a chip (SOC). In another embodiment, the instructions are read into a volatile semiconductor memory when the data storage device is powered on. In yet another embodiment, the control circuitry comprises suitable logic circuitry, such as state machine circuitry.

What is claimed is:

1. A data storage device comprising:
   a non-volatile memory;
   a logical block address (LBA) table for storing plaintext data used to access the non-volatile memory; and
   control circuitry including a secure processor and a device processor, wherein:
   the secure processor is operable to:
      initialize the LBA table with at least one authentication code over the plaintext data; and
      verify whether the plaintext data has been modified illegally in response to the authentication code; and
   the device processor is operable to:
      receive an access command from a host; and
      evaluate the plaintext data in the LBA table to determine whether to allow the access command.

2. The data storage device as recited in claim 1, wherein the LBA table comprises a plurality of entries, and each entry comprises:
   an address range for accessing the non-volatile memory;
   a state field indicating whether the corresponding address range is locked; and
   an authentication code generated over the plaintext data.

3. The data storage device as recited in claim 2, wherein the state field indicates whether the corresponding address range is one of locked read/write, unlocked read, unlocked write, or unlocked read/write.

4. The data storage device as recited in claim 2, wherein:
   the device processor is further operable to:
      receive a security command from the host to unlock one of the entries; and
      request the secure processor to unlock the entry; and
   the secure processor is further operable to:
      unlock the entry by modifying the state field; and
      generate an updated authentication code over the modified plaintext data.

5. The data storage device as recited in claim 2, wherein when the authentication code of an entry indicates the plaintext data was modified illegally, the secure processor is further operable to:
  lock the entry by modifying the state field; and
  generate an updated authentication code over the modified plaintext data.

6. The data storage device as recited in claim 1, wherein when the authentication code indicates the plaintext data was modified illegally, the secure processor is further operable to prevent access to at least part of the non-volatile memory.

7. The data storage device as recited in claim 1, wherein:
  the device processor is operable to execute the access command by requesting the secure processor to execute the access command; and
  the secure processor is operable to verify whether the plaintext data has been modified illegally in response to the authentication code prior to executing the access command.

8. The data storage device as recited in claim 1, wherein the secure processor periodically verifies the authentication code over the plaintext data.

9. The data storage device as recited in claim 1, wherein the non-volatile memory comprises a head actuated over a disk of a disk drive.

10. The data storage device as recited in claim 1, wherein the non-volatile memory comprises a semiconductor memory of a solid state drive.

11. A method of operating a data storage device, the data storage device comprising a non-volatile memory and a logical block address (LBA) table for storing plaintext data used to access the non-volatile memory, the method comprising:
  initializing the LBA table with at least one authentication code over the plaintext data;
  receiving an access command from a host;
  verifying whether the plaintext data has been modified illegally in response to the authentication code; and
  evaluating the plaintext data in the LBA table to determine whether to allow the access command.

12. The method as recited in claim 11, wherein the LBA table comprises a plurality of entries, and each entry comprises:
  an address range for accessing the non-volatile memory;
  a state field indicating whether the corresponding address range is locked; and
  an authentication code generated over the plaintext data.

13. The method as recited in claim 12, wherein the state field indicates whether the corresponding address range is one of locked read/write, unlocked read, unlocked write, or unlocked read/write.

14. The method as recited in claim 12, further comprising:
  receiving a security command from the host to unlock one of the entries;
  unlocking the entry by modifying the state field; and
  generating an updated authentication code over the modified plaintext data.

15. The method as recited in claim 12, wherein when the authentication code of an entry indicates the plaintext data was modified illegally, further comprising:
  locking the entry by modifying the state field; and
  generating an updated authentication code over the modified plaintext data.

16. The method as recited in claim 11, wherein when the authentication code indicates the plaintext data was modified illegally, further comprising preventing access to at least part of the non-volatile memory.

17. The method as recited in claim 11, further comprising verifying whether the plaintext data has been modified illegally in response to the authentication code prior to executing the access command.

18. The method as recited in claim 11, further comprising periodically verifying the authentication code over the plaintext data.

19. The method as recited in claim 11, wherein the non-volatile memory comprises a head actuated over a disk of a disk drive.

20. The method as recited in claim 11, wherein the non-volatile memory comprises a semiconductor memory of a solid state drive.

* * * * *